US011227044B2

(12) United States Patent
Zhang et al.

(10) Patent No.: US 11,227,044 B2
(45) Date of Patent: Jan. 18, 2022

(54) SYSTEMS AND METHODS FOR GENERATING AND MANAGING USER AUTHENTICATION RULES OF A COMPUTING DEVICE

(71) Applicant: Microsoft Technology Licensing, LLC, Redmond, WA (US)

(72) Inventors: Jing Zhang, Sunnyvale, CA (US); Anshul Rawat, Kirkland, WA (US); Craig Thomas McIntyre, Kirkland, WA (US); Guillermo Enrique Rueda, Seattle, WA (US); Peter Gregory Davis, Kirkland, WA (US); Nathan Jeffrey Ide, Bothell, WA (US); Ibrahim Mohammad Ismail, Kirkland, WA (US); Pranav Kukreja, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 176 days.

(21) Appl. No.: 16/548,416

(22) Filed: Aug. 22, 2019

(65) Prior Publication Data
US 2021/0056190 A1    Feb. 25, 2021

(51) Int. Cl.
*G06F 21/40* (2013.01)
*G06F 3/0488* (2013.01)
*G06F 21/57* (2013.01)

(52) U.S. Cl.
CPC ............ *G06F 21/40* (2013.01); *G06F 3/0488* (2013.01); *G06F 21/575* (2013.01); *G06F 2221/2147* (2013.01)

(58) Field of Classification Search
CPC ...... G06F 21/40; G06F 3/0488; G06F 21/575; G06F 2221/2147; G06F 2221/2153;
(Continued)

(56) References Cited

U.S. PATENT DOCUMENTS

| 2004/0203895 A1 | 10/2004 | Balasuriya |
| 2012/0174237 A1 | 7/2012 | Krzyzanowski |

(Continued)

FOREIGN PATENT DOCUMENTS

WO    2015065494 A1    5/2015

OTHER PUBLICATIONS

"International Search Report and Written Opinion Issued in PCT Application No. PCT/US2020/037114", dated Sep. 17, 2020, 11 Pages.

(Continued)

*Primary Examiner* — Quazi Farooqui

(57) ABSTRACT

Aspects of the present disclosure include systems and methods for generating and managing user authentication rules of a computing device. In an example, a computing device may include a memory storing instructions and a processor communicatively coupled with the memory and configured to execute the instructions. The processor may determine a state of the computing device, wherein the state of the computing device is one of a locked state or an unlocked state. The processor may determine a user authentication rule corresponding to the state of the computing device. The processor may also identify whether a combination of signals associated with the user authentication rule of the computing device are received by the computing device. The processor may also change or maintain the state of the computing device based on the combination of signals being received.

20 Claims, 8 Drawing Sheets

(58) Field of Classification Search
CPC .. G06F 2221/2111; G06F 21/316; G06F 3/00; G06F 21/57; E05B 47/00; G07C 9/00; G07C 9/00174; G07C 9/00182
See application file for complete search history.

(56) References Cited

U.S. PATENT DOCUMENTS

| | | |
|---|---|---|
| 2012/0280917 A1 | 11/2012 | Toksvig et al. |
| 2013/0104187 A1* | 4/2013 | Weidner .................. G06F 21/45 726/1 |
| 2013/0176107 A1* | 7/2013 | Dumas ............... G07C 9/00571 340/5.61 |
| 2014/0282877 A1 | 9/2014 | Mahaffey et al. |
| 2015/0295901 A1 | 10/2015 | Woodward et al. |
| 2016/0048705 A1 | 2/2016 | Yang et al. |
| 2016/0063894 A1* | 3/2016 | Lee ...................... G09B 21/003 715/729 |
| 2016/0119789 A1 | 4/2016 | Hu et al. |
| 2016/0164865 A1 | 6/2016 | Speicher et al. |
| 2017/0085565 A1 | 3/2017 | Sheller et al. |

OTHER PUBLICATIONS

Hildenbrand, Jerry., "How to use Smart Lock to unlock your phone automatically", Retrieved from: https://www.androidcentral.com/smart-lock, Jan. 28, 2018, 9 Pages.

* cited by examiner

SYSTEMS AND METHODS FOR GENERATING AND MANAGING USER AUTHENTICATION RULES OF A COMPUTING DEVICE

BACKGROUND

The present disclosure relates to computing devices, and more particularly, to systems and methods for generating and managing user authentication rules of a computing device.

A user may need to lock a computing device and/or an application on the computing device according to different security-risk situations, such as the location of the computing device or the presence of another user, for security reasons. In doing so, the user may be required to be continuously vigilant to the different security-risk situations in order to quickly lock the computing device and/or application. The need for continued vigilance by the user may be burdensome for the user. Further, a computing device may require a user to enter user authentication information to unlock the computing device for the user to access applications on the computing device. In some examples, the user authentication information may be entered by way of user entered passwords or biometric credentialing, such as a finger print or facial recognition. However, after a certain period of time and/or inactivity, the computing device may return to a locked state and thereby require the user to reenter the user authentication information for unlocking the computing device again. While user authentication information provides security for accessing the computing device, entering the user authentication information may be time consuming and burdensome for the user.

Accordingly, there is a need in the art for improvements to locking and unlocking a computing device and/or maintaining the computing device in a locked state or an unlocked state.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

According to aspects of the present disclosure, systems and methods for generating and managing user authentication rules of a computing device are described. In an example, a computing device is provided. The computing device may include a memory storing instructions for user authentication for the computing device, and a processor communicatively coupled with the memory. The processor may be configured to execute the instructions to determine a state of the computing device as one of a locked state or an unlocked state. The processor may also be configured to execute the instructions to determine a user authentication rule corresponding to the state of the computing device. The processor may also be configured to execute the instructions to identify whether a combination of signals associated with the user authentication rule of the computing device are received by the computing device. The processor may also be configured to execute the instructions to change or maintain the state of the computing device based on the combination of signals being received.

In another example, a method is provided. The method may include determining a state of a computing device as one of a locked state or an unlocked state. The method may also include determining a user authentication rule corresponding to the state of the computing device. The method may also include identifying whether a combination of signals associated with the user authentication rule of the computing device are received by the computing device. The method may also include changing or maintaining the state of the computing device based on the combination of signals being received.

In another example, a computer-readable medium storing instructions executable by a processor is provided. The computer-readable medium may store instructions to determine a state of a computing device as one of a locked state or an unlocked state. The computer-readable medium may also store instructions to determine a user authentication rule corresponding to the state of the computing device. The computer-readable medium may also store instructions to identify whether a combination of signals associated with the user authentication rule of the computing device are received by the computing device. The computer-readable medium may also store instructions to change or maintain the state of the computing device based on the combination of signals being received.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for generating and managing user authentication rules of a computing device. In an example, the systems and methods disclosed herein may allow a computing device to lock or unlock the computing device or maintain the computing device in a locked state or an unlocked state based on a combination of signals received by the computing device thereby minimizing a number of times a user is required to enter credentials on the computing device.

For example, a computing device, such as a laptop, person computer, a tablet, or a smartphone, would enable a user to "trust and remember" a network, one or more Bluetooth devices, or other signals the computing device is connected to. The user may use the computing device and/or applications on the computing device without providing credentials, such as username and password, as long as the computing device is connected to the trusted and remembered signals. Alternatively, the user may need to provide credentials when the user attempts to login or unlock the computing device and/or the applications and the computing device is not connected to all of the trusted and remembered signals.

In some examples, a "remember me" checkbox may be present on a sign-in screen of the computing device or an application on the computing device. Once checked, and the user has entered valid credentials, information about available signals (e.g., network, Bluetooth devices) the computing device is connected to at the moment may be displayed for the user to select. The user may select signals from the available signals for the computing device to "trust and remember" the signals for future login attempts and/or for maintaining the computing device or the application in an unlocked state while the trusted and remembered signals are available.

In some examples, when the computing device is not connected to one or more of the trusted and remembered signals, the computing device may be locked and the user may be required to provide credentials again in order to sign-in to the computing device and/or the application. Further, in an aspect, the user may be able to change the "trusted and remembered" signals at any time. Accordingly, the system provides highly configurable and secure techniques for a user to sign in, remain signed in, and/or sign out of the computing device and/or an application of the computing device, which are not provided by typical security techniques.

Turning now to the figures, examples of systems and methods for generating and managing user authentication rules of a computing device are depicted. It is to be understood that aspects of the figures may not be drawn to scale and are instead drawn for illustrative purposes.

Figure 1:
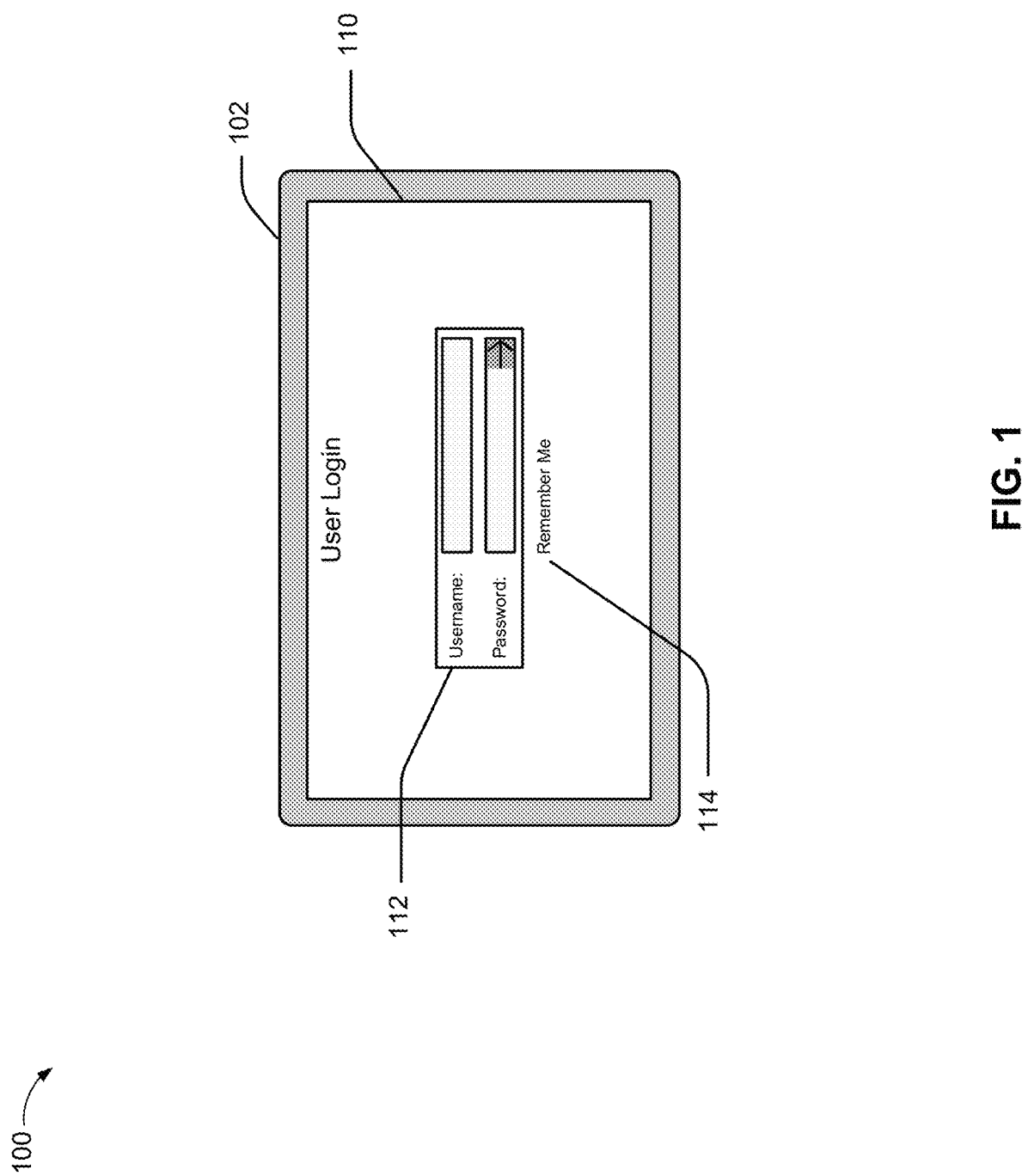
FIG. 1 is a conceptual view of an example user interface of a computing device, according to aspects of the present disclosure.

Referring to FIG. 1, a conceptual view of an example 100 of a user interface 110 for a computing device 102 is depicted. Examples of the computing device 102 may include a cellular phone, a smart phone, a laptop, a personal digital assistant (PDA), a multimedia device, a video device, a digital audio player (e.g., MP3 player), a camera, a game console, a tablet, a smart device, a wearable device, a large or small kitchen appliance, or IoT devices any other similar functioning device that is capable of receiving a plurality of signals and providing a means for a user to select at least some of the plurality of signals.

As shown, the user interface 110 may include a sign-in field 112 for a user to enter credentials, such as username and password, and submitting the credentials for signing into an operating system, or an application, of the computing device 102. The user interface 110 may also include a "Remember Me" checkbox 114 which may allow the user to select whether to access user authentication rules settings for unlocking or locking the computing device 102 and/or applications on the computing device 102.

Figure 2:
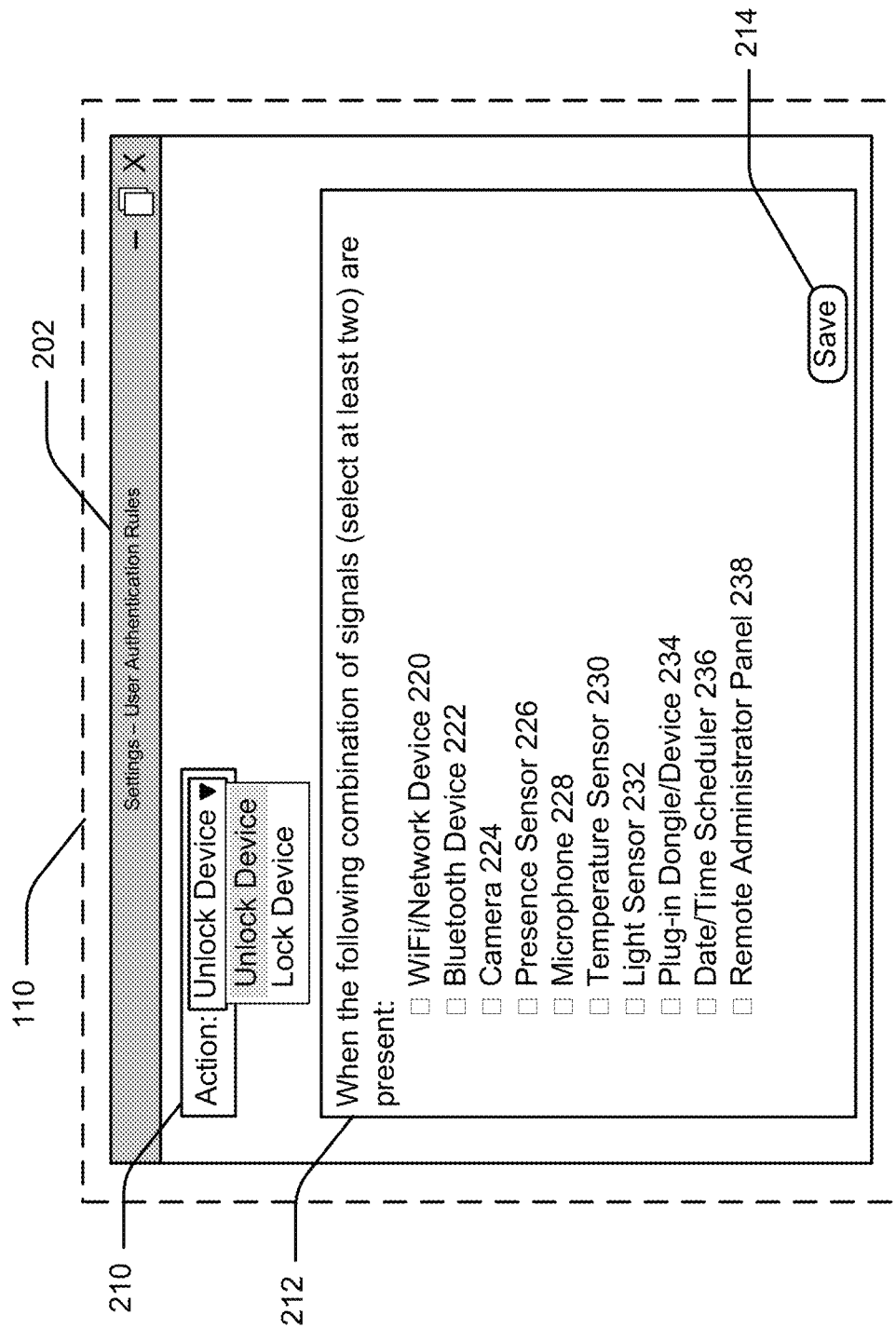
FIGS. 2-6 are conceptual views of examples of a user authentication rule interface of the computing device, according to aspects of the present disclosure.

Referring to FIG. 2, a conceptual view of an example of the user interface 110 for managing user authentication rules is depicted. After credentials are submitted, and if the "Remember Me" checkbox 114 is selected, the user interface 110 may transition to a settings window 202 which includes an action 210 associated with the sign-in field 112. In this example, the action 210 is directed towards maintaining an unlocked state once the user is signed in to the computing device 102 or an application. However, in other examples, as disclosed herein, the action 210 may be directed towards locking the computing device 102.

The settings window 202 may also include an available options interface 212 which provides a list of available options (e.g. signal options 220-238) the user may select to perform the action 210 (e.g., maintain in locked state), as described in more detail herein. The settings window 202 may also include a save button 214 which saves a selection of options from the available options interface 212 as a user authentication rule.

As shown by FIG. 2, an example 200 of the available options interface 212 is depicted. The available options interface 212 may include a list of one or more signals including one or more signals of a WiFi/Network device 220, signals of a Bluetooth device 222, signals of a camera 224, signals of a presence sensor 226, signals of a microphone 228, signals of a temperature sensor 230, signals of a light sensor 232, signals of a plug-in dongle/device 234, signals of a date/time scheduler 236, or signals of a remote administrator panel 238.

In an aspect, the computing device 102 may receive one or more signals of WiFi/Network device 220 indicating that the computing device 102 is within range of the WiFi/Network device, and, in some cases, allowing the computing device 102 to connect to the WiFi/Network device 220 in order to receive access to a network and/or the Internet. Accordingly, the available options interface 212 may provide options for the action 210 (e.g., maintain unlocked device) to occur based on connection to or detection of signals of the WiFi/Network device 220, as described herein. Examples of the WiFi/Network device may include one or more work networks (wired or wireless), home networks (wired or wireless), public WiFis, smart devices, speakers, Internet-of-Things (IoT) devices, smart home devices (e.g., thermostats, door/window locks, appliances, lighting), or any type of WiFi broadcasting or networked device that transmits a WiFi or network signal.

In an aspect, the computing device 102 may receive one or more signals of the Bluetooth device 222 indicating that the computing device 102 is within range of the Bluetooth device, and, in some cases, allowing the computing device 102 to connect to the Bluetooth device in order to receive access to the Bluetooth device and the capabilities of the Bluetooth device. Accordingly, the available options interface 212 may provide options for the action 210 (e.g., maintain unlocked device) to occur based on connection to or detection of signals of the Bluetooth device 222, as described herein. Examples of the Bluetooth device may include one or more smart devices, speakers, Internet-of-Things (IoT) devices, smart home devices (e.g., thermostats, door/window locks, appliances, lighting) or any type of Bluetooth device that transmits a Bluetooth signal.

In an aspect, the computing device 102 may receive one or more signals of a camera 224 including image information corresponding to the action 210. For example, the image information may correspond to a facial image of the user, and the signal may provide information for the computing device 102 to perform facial recognition. Accordingly, the available options interface 212 may provide options for the action 210 (e.g., maintain unlocked device) to occur based on the image information. Examples of the camera may include one or more red, green, blue (RGB) cameras, near-infrared (NIR) cameras, or any type of camera capable of capturing an image and transmitting information corresponding to the image in signal.

In an aspect, the computing device 102 may receive one or more signals of a presence sensor 226 to indicate a presence of one or more individuals within a proximity to the computing device 102. The signal from the presence sensor 226 may be used to indicate, for example, to the computing device 102 to perform the action 210 (e.g., maintain unlocked device) when only a single individual is present and/or to not perform the action 210 (e.g., lock device) when more than one individual is present. The presence sensor may be connected with the computing device 102 or external to the computing device 102. Examples of the presence sensor may include one or more proximity sensors, touch sensors, motion sensors, badge reader, or any type of sensor for detecting a presence of one or more individuals near the computing device 102 and sending a signal containing information on the presence of one or more individuals to the computing device 102.

In an aspect, the computing device 102 may receive one or more signals of a microphone 228 to indicate one or more of ambient noise, voice detection, and/or speech detection. The microphone may indicate, for example for the computing device 102 to perform the action 210 (e.g., maintain unlocked device) based on any one or more of an ambient noise, a voice, or a speech being detected. The microphone may include one or more microphones connected to or external to the computing device 102.

In an aspect the computing device 102 may receive one or more signals of a temperature sensor 230 to indicate, for example, an ambient temperature near the computing device 102. The available options interface 212 may provide options for the action 210 (e.g., maintain unlocked device) to occur based on the ambient temperature of a room where the computing device 102 is located. The temperature sensor may include one or more temperature sensors connected to or external to the computing device 102.

In an aspect the computing device 102 may receive one or more signals of a light sensor 232 to indicate, for example, ambient light near the computing device 102. In some examples, the available options interface 212 may provide options for the action 210 (e.g., maintain unlocked device) to occur based on the ambient light levels near the computing device. The light sensor may include one or more infrared light sensors or photoelectric sensors connected to or external to the computing device 102.

In an aspect the computing device 102 may receive one or more signals of a plug-in dongle/device 234 to indicate, for example, the attachment of the plug-in dongle/device to the computing device 102 or an external device to perform the action 210. Examples of the plug-in dongle/device may include a Universal Serial Bus (USB) drive or security dongle.

In an aspect the computing device 102 may receive one or more signals of a date/time scheduler 236 indicating a date and/or time for performing the action 210 (e.g., maintain unlocked device). As described herein, the signals of the date/time scheduler 236 may indicate, for example, that the computing device 102 may perform the action 210 according to the scheduled time and date.

In an aspect the computing device 102 may receive one or more signals of a remote administrator panel 238 indicating an administrator is remotely accessing the computing device 102. In some examples, the available options interface 212 may provide options for the action 210 (e.g., maintain unlocked device) to occur based on the connection of the remote administrator to the computing device 102.

After the options have been selected, the user may save a generated user authentication rule by selecting the save button 214.

Figure 3:
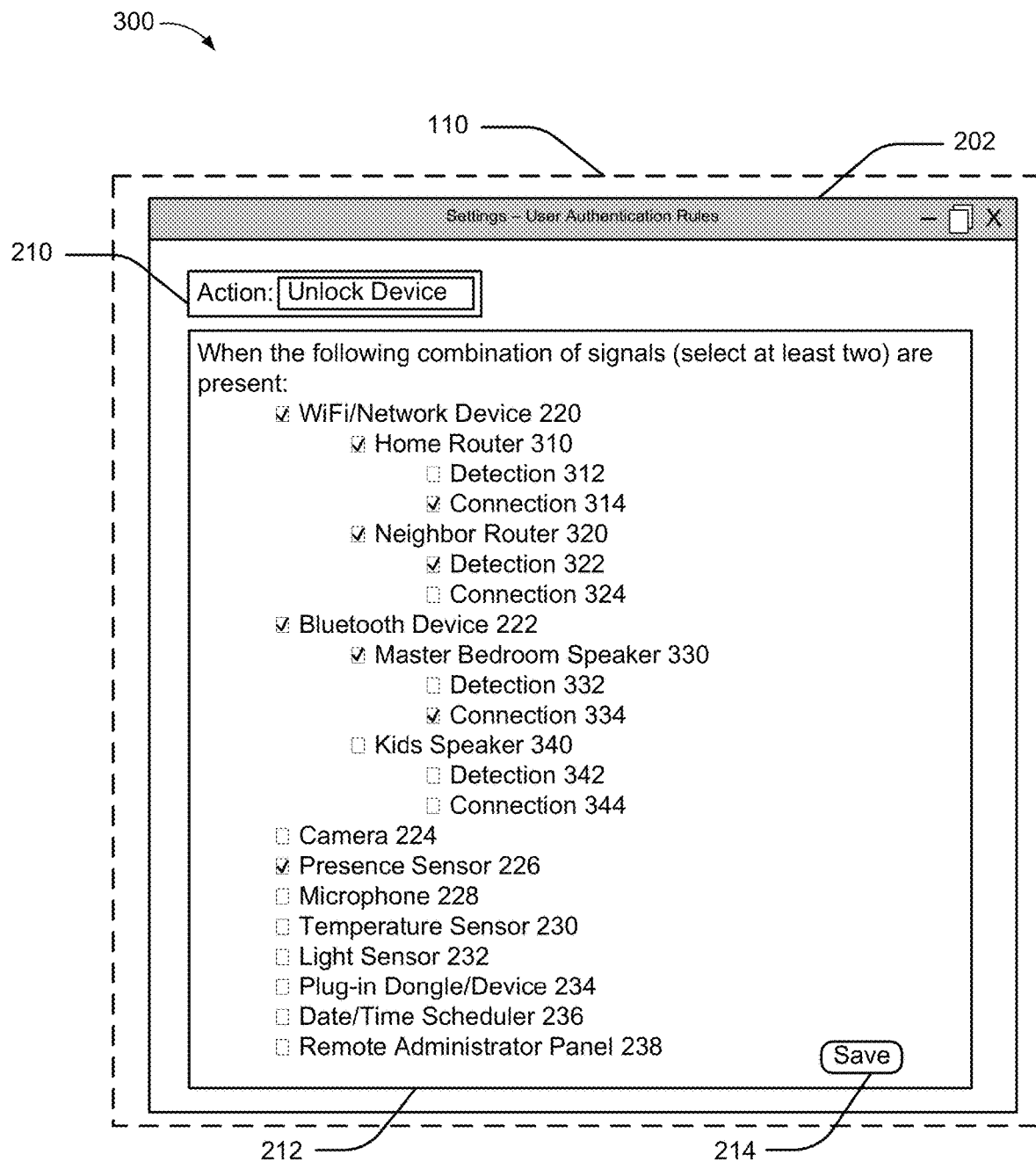
Figure 4:
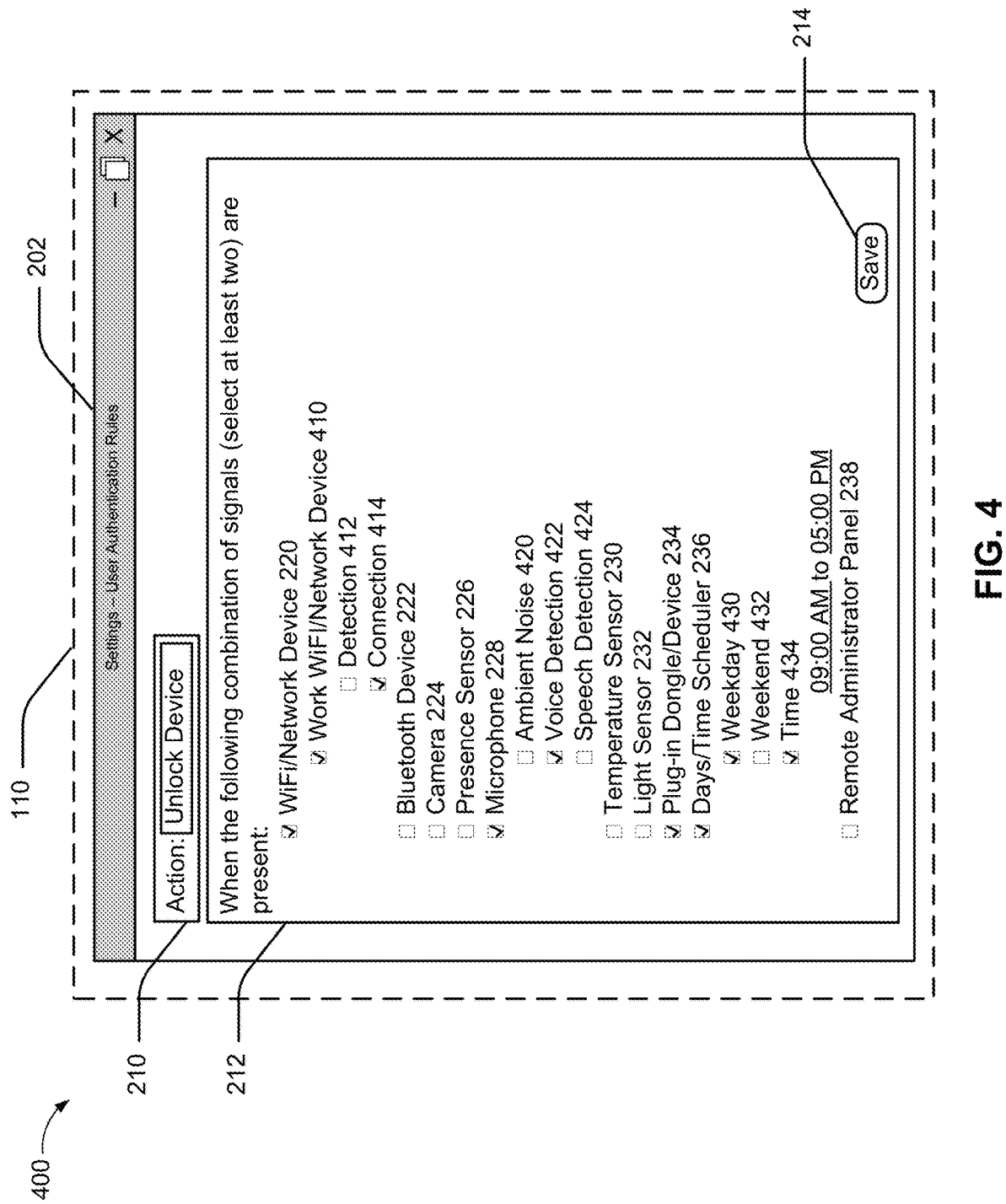

Referring to FIGS. 3 and 4, additional examples 300 and 400 of the available interface 212 are depicted to further describe examples of available signaling options the settings window 202 of the user interface 110 may display for a user to link to the action 210 to generate user authentication rules. In an example, the user may select signal options (e.g., one or more signal options 220-238 described herein) which include available signals detected by and/or connected to the computing device 102 and link the signal options to the action 210 of maintaining the computing device 102 in an unlocked state based on a desired location (e.g., master bedroom at home or office at work).

In the first example 300, the user may want to generate an authentication rule that allows the user to maintain an unlocked state of the computing device 102 while the user is in a master bedroom at the user's home. As shown by FIG. 3, the signal options 220-238 may be detected by and/or connected to the computing device 102. When the user selects a signal option (e.g., WiFi/network device 220), detailed information of the selected signal option may be displayed in the available options interface 212. The detailed information may include names of the available devices and/or signaling options to be used for the user authentication rules. For example, when the WiFi/network device 220 is selected, a list of available WiFi/network devices 220, such as home router 310 and/or neighbor router 320, may be displayed in the available options interface 212 for a user to select. In some examples, additional options may allow the user to configure a user authentication rule based on whether the computing device 102 needs to actually connect to or merely detect a signal from a device. For example, the available options interface 212 may display detection 312 or connection 314 of the home router 310 or detection 322 or connection 324 of the neighbor router 320 for the user to select. While not shown, in some examples, the available options interface 212 may also include the options of selecting a signal strength of the one or more of the signal options thereby allowing a user to generate a user authentication rule based on signal strength of signals.

The options of selecting between the detection of or the connection to the computing device 102, may apply to any of the other signal options. For example, when the Bluetooth device 222 is selected, a list of available Bluetooth devices 222, such as master bedroom speaker 330 and/or kids speaker 340, may be displayed in the available options interface 212 for a user to select. Further, the additional options of detection 332 or connection 334 of the master bedroom speaker 330 or detection 342 or connection 344 of the kids speaker 340 may be displayed.

Accordingly, in the example 300, the user may generate a user authentication rule to perform the action 210 of maintaining an unlocked device based on connection 314 to the home router 310, detection 322 of the neighbor router 320, connection 332 to the master bedroom speaker, and detects the presence of the user via a presence sensor 226. Further, the user may save a generated user authentication rule by selecting the save button 214.

In a second example 400, the user may want to generate an authentication rule that allows the user to maintain an unlocked state of the computing device 102 while the user is in an office at the user's work. Accordingly, additional signaling options, configured for the user's work, may be displayed by the available options interface 212 for a user to link the action 210 to generate authentication rules. For example, in addition to the availability of selecting detection 412 or connection 414 of work WiFi/network device 410 under the WiFi/network device 220 signal options, the available options interface 212 may also display techniques for using a signal option. For example, when selecting the microphone 228, the available options interface 212 may display the options of detecting ambient noise 420, voice detection 422 and/or speech detection 424 to link selected functions of the microphone 228 to the action 210. Further, when selecting days/time scheduler 236 the detailed information of a day of the week, or weekday 430, weekend 432, and/or time 434 may be displayed in the available options interface 212.

Accordingly, in the example 400, the user may generate a user authentication rule to perform the action 210 of maintaining an unlocked device based on connection 414 to the work WiFi/network device 410 of the WiFi/network device 220 signal option, voice detection 422 by the microphone 228 signal option, detection of a plug-in dongle 234, and during workday 430 time 434 of 9 AM to 5 PM of the days/time scheduler 236. Use of the combination of the connecting to and detecting devices, networks etc. along with other available options may provide the computing device 102 highly configurable options which allow a user the capabilities to focus the action 210 on specific locations or events for security purposes.

Figure 5:
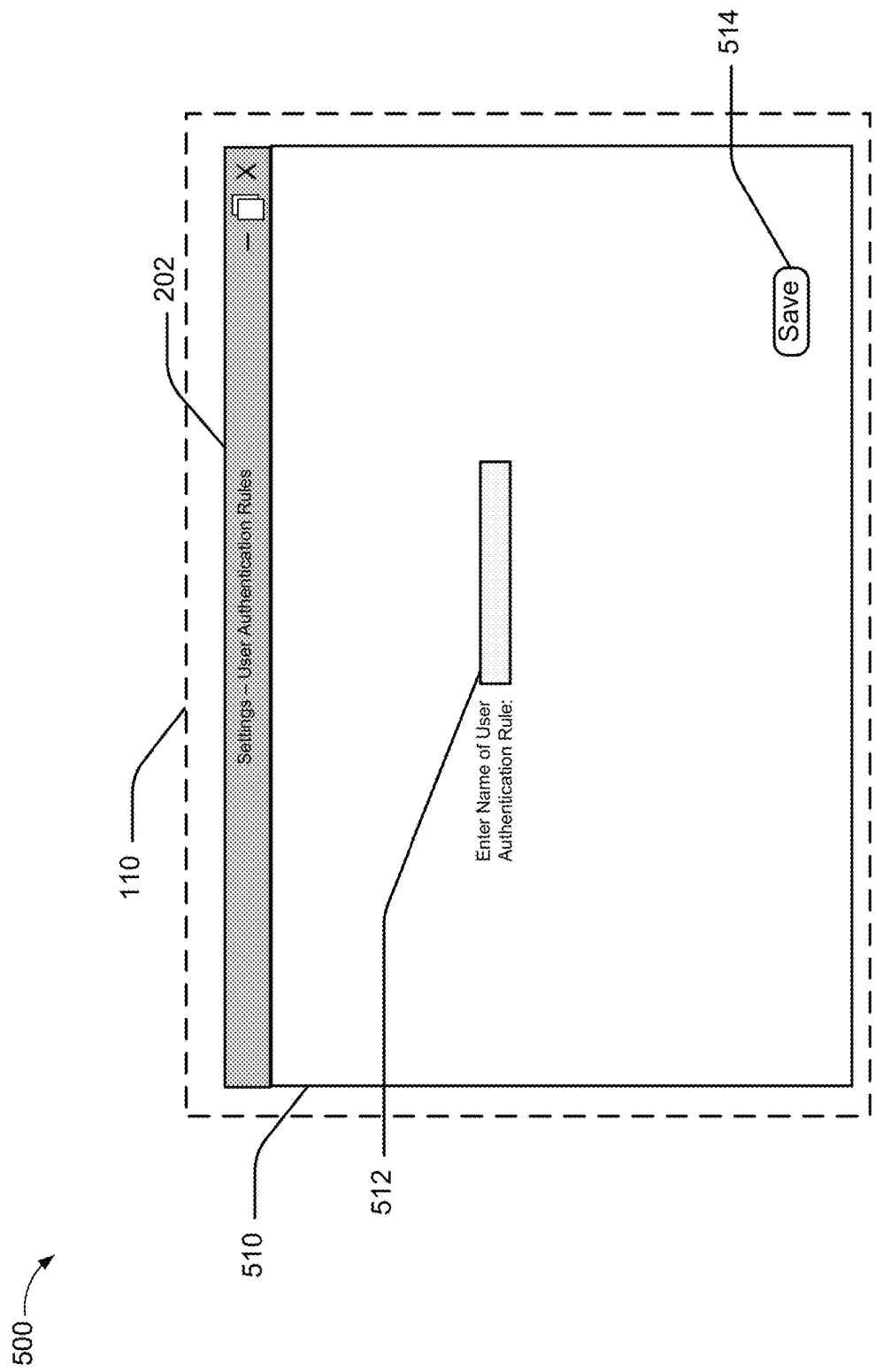

Referring to FIG. 5, an example 500 of an authentication rule being saved in the settings window 202 of the user interface 110 is depicted. In this example, once the user selects the save button 214, the settings window 202 may transition to a saved rules interface 510 which displays a name field 512 for the user provide a name which will correspond to the user authentication rule. After entering a name in the name field 512, the user may select a save button 514. Once the save button 514 is selected, the name of the user authentication rule is linked to the user authentication rule and the both are stored in a memory (e.g., memory 804 of FIG. 8).

Figure 6:
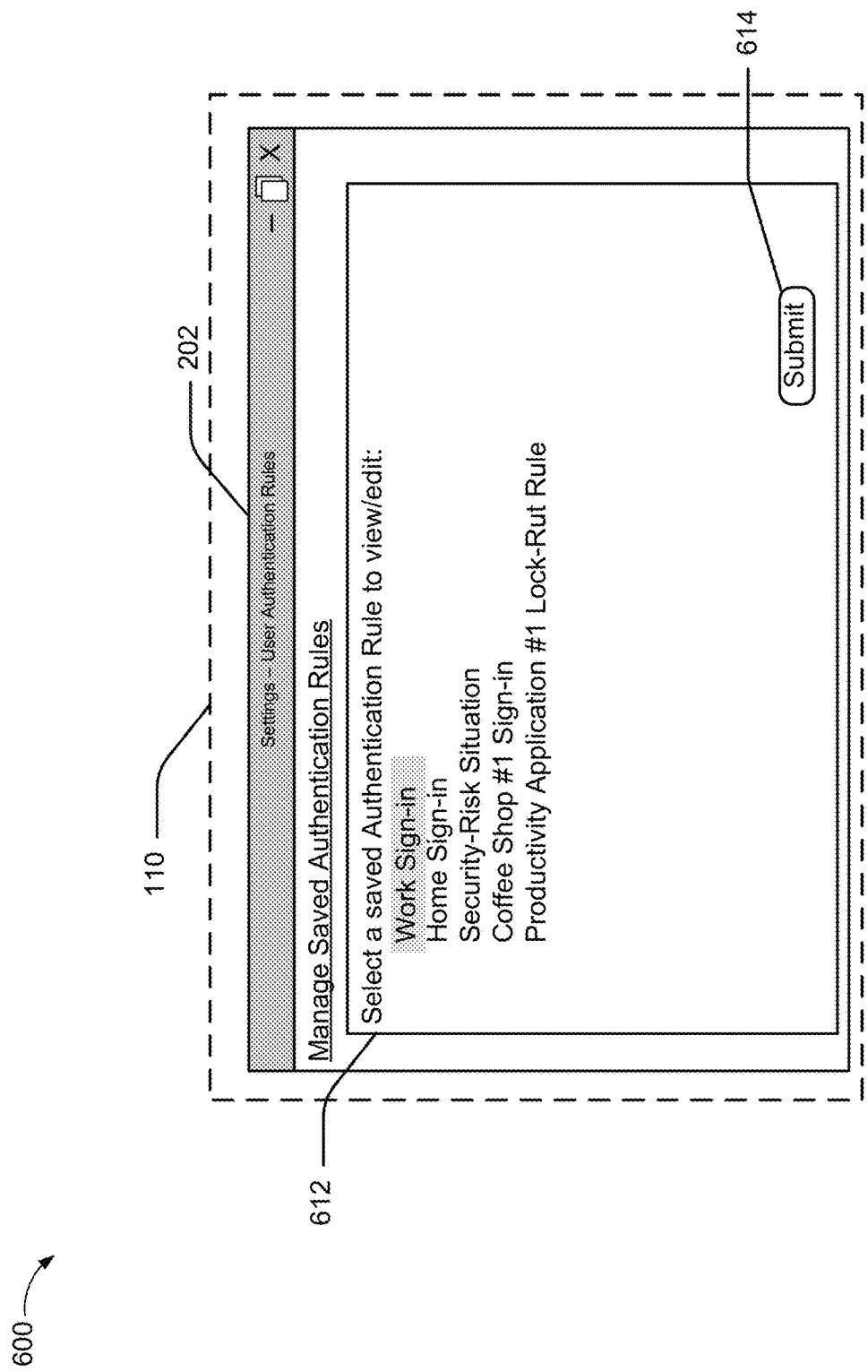

Referring to FIG. 6, an example 600 of authentication rules interface 612 is depicted. In this example, the user may select a saved authentication rule via the authentication rules interface 612. As shown, a list of generated authentication rules may be displayed for a user to select. Once selected, the user may select a submit button 614 to display an available options interface 512, as described herein, corresponding to the selected authentication rule for the user to view and/or edit.

Figure 7:
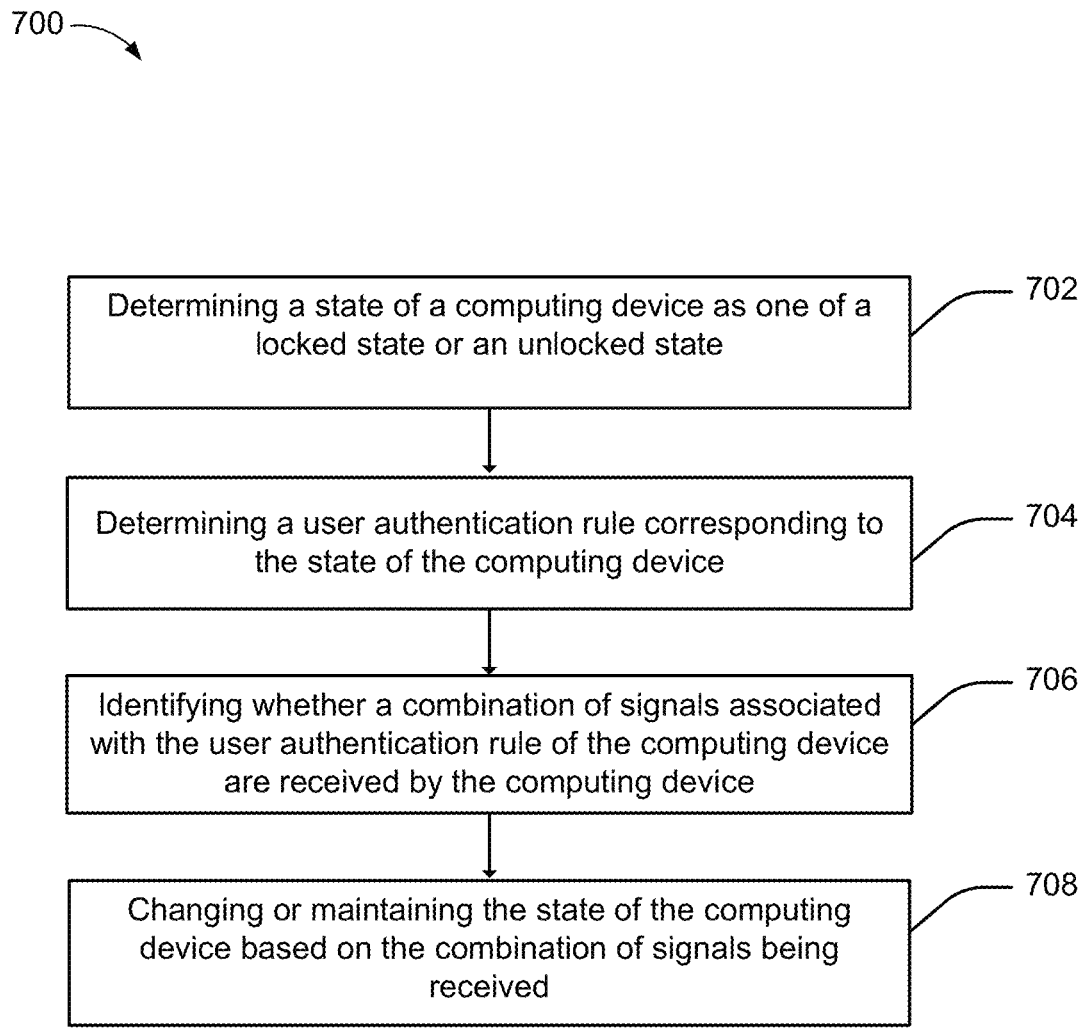
FIG. 7 is a flowchart of an example of a method for generating and managing user authentication rules of the computing device, according to aspects of the present disclosure.

Referring to FIG. 7, an example method 700 for generating and managing user authentication rules of a computing device is depicted. In an example, the method 700 may be performed by the computing device 102 of FIG. 1 and one or more components of the computing device 102, as described herein (see e.g., FIG. 8). Examples of the operations of the method 700 may be described in relation to FIGS. 1-6.

At 702, the method 700 may include determining a state of a computing device as one of a locked state or an unlocked state. For example, the computing device 102 and/or one or more components (e.g., processor 802 and/or state determiner 820 of FIG. 8) of the computing device 102 may determine a state of the computing device 102. In an example, one or more of the processor 802 or the state determiner 820 may determine the state of the computing device 102 by checking a state bit indicating whether the computing device 102 is locked (e.g., "0") or unlocked (e.g., "1").

At 704, the method 700 may include determining a user authentication rule corresponding to the state of the computing device. For example, the computing device 102 and/or one or more components (e.g., processor 802 and/or rule determiner 822 of FIG. 8) of the computing device 102 may determine a user authentication rule corresponding to the state of the computing device 102. In an example, one or more of the processor 802 or the rule determiner 822 may determine user authentication rules corresponding to the state of the computing device 102 by reading saved user authentication rules and the actions 210 corresponding user authentication rules. The processor 802 may determine the action 210 may match a corresponding state of the computing device 102. For example, the action 210 of unlocking the device may match a locked state of the computing device 102, the action 210 of maintaining the device in an unlocked state may match an unlocked state of the computing device 102, and the action 210 of locking the device may match an unlocked state of the computing device 102.

In some examples, the user authentication rule may include one or more user selected instructions indicating the combination of signals for user authentication, as depicted by FIGS. 1-6.

In some examples, the user authentication rule may include a presence of two or more of network signals, connected device signals, camera signals, microphone signals, presence signals, ambient temperature signals, light signals, remote indication of presence signals, date or time signals, remote administrator signals, and/or any combinations thereof.

In some examples, one or more of the processor 802, the rule determiner 822, or timer 828 may determine an idle time out for the computing device 102 occurred and determine the combination of signals associated with the user authentication rule of the computing device are received in response to the idle time out.

At 706, the method 700 may include identifying whether a combination of signals associated with the user authentication rule of the computing device are received by the computing device. For example, the computing device 102 and/or one or more components (e.g., processor 802 and/or signal identifier 824 of FIG. 8) of the computing device 102 may identify whether a combination of signals associated with the user authentication rule of the computing device 102 are received by the computing device 102. In an example, one or more of the processor 802 or the signal identifier 824 may determine which signals correspond to the user authentication rule by reading the user authentication rule and determine which signals the computing device 102 has received or is receiving. The one or more of the processor 802 or the signal identifier 824 may compare the signals of the user authentication rule to the received signals to identify whether a combination of signals received match a combination of signals of the user authentication rule.

At 708, the method 700 may include changing or maintaining the state of the computing device based on the combination of signals being received. For example, the computing device 102 and/or one or more components (e.g., processor 802 and/or state manager 826 of FIG. 8) of the computing device 102 may change or maintain the state of the computing device 102 based on the result of the comparison between the signals of the user authentication rule to the received signals. For example, when a combination of signals of the user authentication rule do not match a combination of received signals, one or more of the processor 802 or the state manager 826 may change (or maintain depending on user authentication rule) a state of the computing device 102 by changing the state bit. In another example, one or more of the processor 802 or the state manager 826 may maintain (or change depending on user authentication rule) a state of the computing device 102 by not changing the state bit when the combination of signals of the user authentication rule match a combination of received signals.

Figure 8:
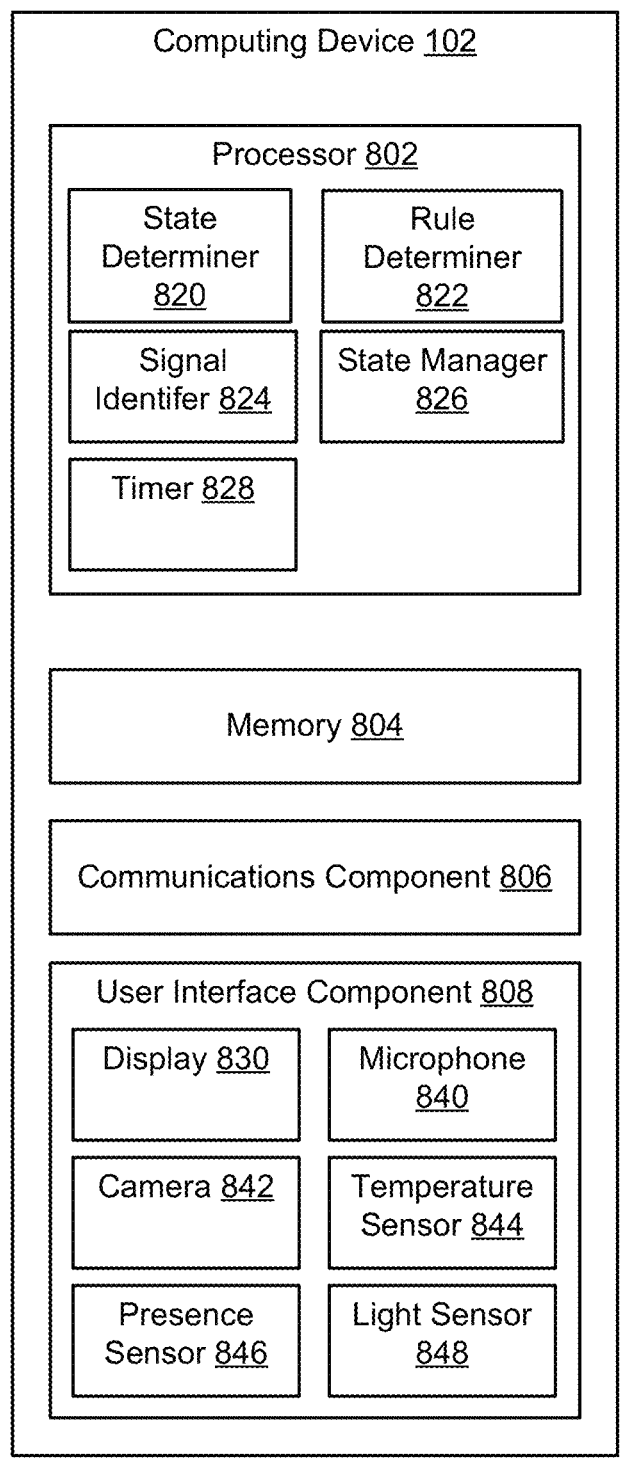
FIG. 8 is a block diagram of additional components of the example computing device of FIG. 1, according to aspects of the present disclosure.

Referring now to FIG. 8, illustrated is an example of other components of the computing device 102 in accordance with an implementation, including additional component details as described herein. In one example, the computing device 102 may include a processor 802 for carrying out processing functions associated with one or more of the components and the functions described herein. The processor 802 may include a single processor or a multiple set of processors or multi-core processors. Moreover, the processor 802 may be implemented as an integrated processing system and/or a distributed processing system. In an implementation, for example, the processor 802 may include the state determiner 820, the rule determiner 822, the signal identifier 824, the state manager 826, and/or the timer 828.

In an example, the computing device 102 may include memory 804 for storing instructions executable by the processor 802 for carrying out the functions described herein. Further, the memory 804 may store one or more authentication rules, as described herein.

The computing device 102 may include a communications component 806 that provides for establishing and maintaining communications with one or more parties utilizing hardware, software, and services as described herein. The communications component 806 may carry communications between components on the computing device 102, as well as between the computing device 102 and external devices and devices located across a communications network and/or devices serially or locally connected to the computing device 102. For example, the communications component 806 may include one or more buses, and may further include transmit chain components and receive chain components associated with a transmitter and receiver, respectively, operable for interfacing with external devices. In an example, the communications component 806 may communicate with other devices using one or more technologies such as WiFi, Bluetooth, infrared, or any other technology configured to receive a signal with which the computing device 102 may generate and manage user authentication rules.

Computing device 102 may also include a user interface component 808 operable to receive inputs from a user and/or a sensor of the computing device 102 and further operable to generate outputs for presentation to the user. The user interface component 808 may include one or more input devices including but not limited to a microphone 840, a camera 842, a temperature sensor 844, a presence sensor 846, a light sensor 848, a keyboard, a number pad, a mouse, a display 830 (e.g., touch-sensitive), a digitizer, a navigation key, a function key, a voice recognition component, any other mechanism capable of receiving an input from a user or sensor, or any combination thereof. Further, the user interface component 808 may include one or more output devices, including but not limited to the display 830, a speaker, a haptic feedback mechanism, a printer, any other mechanism capable of presenting an output to a user, or any combination thereof. In an example, the display 830 may present the user interface 110.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computing device, comprising:
   a memory storing instructions for user authentication for the computing device; and
   a processor coupled with the memory and configured to execute the instructions to:
      determine a state of the computing device as one of a locked state or an unlocked state;
      determine a user authentication rule corresponding to the state of the computing device, wherein the user authentication rule is one of a first user authentication rule associated with the locked state or a second user authentication rule associated with the unlocked state;
      identify whether a combination of signals associated with the user authentication rule of the computing device are received by the computing device;
      change or maintain the state of the computing device in the locked state in response to the combination of signals being a first combination of signals associated with the first user authentication rule; and
      change or maintain the state of the computing device in the unlocked state in response to the combination of signals being a second combination of signals associated with the second user authentication rule.

2. The computing device of claim 1, wherein the user authentication rule includes one or more user selected instructions indicating the combination of signals for user authentication.

3. The computing device of claim 1, wherein the user authentication rule includes a presence of two or more of a network signal, a connected device signal, camera signal, a microphone signal, a presence signal, an ambient temperature signal, a light signal, a remote indication of presence signal, date or time signal, or a remote administrator signal.

4. The computing device of claim 1, wherein the state of the computing device is the unlocked state, wherein the processor is further configured to execute the instructions to:
   determine the combination of signals associated with the user authentication rule of the computing device are received; and
   maintain the state of the computing device in the unlocked state based on the combination of signals being received.

5. The computing device of claim 4, wherein the processor is further configured to execute the instructions to:
   determine an idle time out for the computing device occurred; and
   determine the combination of signals associated with the user authentication rule of the computing device are received in response to the idle time out.

6. The computing device of claim 1, wherein the state of the computing device is the unlocked state, wherein the processor is further configured to execute the instructions to:
   determine the combination of signals associated with the user authentication rule of the computing device are received; and
   change the state of the computing device to the locked state based on the combination of signals being received.

7. The computing device of claim 1, wherein the state of the computing device is the locked state, wherein the processor is further configured to execute the instructions to:
   determine the combination of signals associated with the user authentication rule of the computing device are received; and
   change the state of the computing device to the unlocked state based on the combination of signals being received.

8. The computing device of claim 1,
   wherein the memory comprises a first plurality of user authentication rules associated with the locked state and a second plurality of user authentication rules associated with the unlocked state, the first plurality of user authentication rules including the first user authentication rule, and the second plurality of user authentication rules including the second user authentication rule;
   wherein the first plurality of user authentication rules each identify different locked state sets of signals;
   wherein the second plurality of user authentication rules each identify different unlocked state sets of signals;
   wherein to identify whether the combination of signals associated with the user authentication rule of the computing device are received by the computing device further comprises to:
      identify a received combination of signals;
      compare the received combination of signals to each of the different unlocked state sets of signals in response to determining the computing device is in the unlocked state to identify whether an unlocked state rule match exists; and
      compare the received combination of signals to each of the different locked state sets of signals in response to determining the computing device is in the locked state to identify whether a locked state rule match exists; and wherein to change or maintain the state of the computing device is further based on whether the unlocked state rule match exists or the locked state rule match exists.

9. The computing device of claim 1, wherein to determine the user authentication rule corresponding to the state of the computing device further comprises:
reading an action linked to the user authentication rule; and
determining the action matches a corresponding state of the computing device.

10. A method, comprising:
determining a state of a computing device as one of a locked state or an unlocked state;
determining a user authentication rule corresponding to the state of the computing device, wherein the user authentication rule is one of a first user authentication rule associated with the locked state or a second user authentication rule associated with the unlocked state;
identifying whether a combination of signals associated with the user authentication rule of the computing device are received by the computing device;
changing or maintaining the state of the computing device in the locked state in response to the combination of signals being a first combination of signals associated with the first user authentication rule; and
changing or maintaining the state of the computing device in the unlocked state in response to the combination of signals being a second combination of signals associated with the second user authentication rule.

11. The method of claim 10, wherein the user authentication rule includes one or more user selected instructions indicating the combination of signals for user authentication.

12. The method of claim 10, wherein the user authentication rule includes a presence of two or more of a network signal, a connected device signal, camera signal, a microphone signal, a presence signal, an ambient temperature signal, a light signal, a remote indication of presence signal, date or time signal, or a remote administrator signal.

13. The method of claim 10, further comprising:
determining the state of the computing device is the unlocked state;
determining the combination of signals associated with the user authentication rule of the computing device are received; and
maintaining the state of the computing device in the unlocked state based on the combination of signals being received.

14. The method of claim 13, further comprising:
determining an idle time out for the computing device occurred; and
determining the combination of signals associated with the user authentication rule of the computing device are received in response to the idle time out.

15. The method of claim 10, further comprising:
determining the state of the computing device is the unlocked state;
determining the combination of signals associated with the user authentication rule of the computing device are received; and
changing the state of the computing device to the locked state based on the combination of signals being received.

16. The method of claim 10, further comprising:
determining the state of the computing device is the locked state;
determining the combination of signals associated with the user authentication rule of the computing device are received; and
change the state of the computing device to the unlocked state based on the combination of signals being received.

17. The method of claim 10,
wherein the first user authentication rule is a first plurality of user authentication rules associated with the locked state and the second user authentication rule is a second plurality of user authentication rules associated with the unlocked state;
wherein the first plurality of user authentication rules each identify different locked state sets of signals;
wherein the second plurality of user authentication rules each identify different unlocked state sets of signals;
wherein identifying whether the combination of signals associated with the user authentication rule of the computing device are received by the computing device further comprises to:
identifying a received combination of signals;
comparing the received combination of signals to each of the different unlocked state sets of signals in response to determining the computing device is in the unlocked state to identify whether an unlocked state rule match exists; and
comparing the received combination of signals to each of the different locked state sets of signals in response to determining the computing device is in the locked state to identify whether a locked state rule match exists; and
wherein changing or maintaining the state of the computing device is further based on whether the unlocked state rule match exists or the locked state rule match exists.

18. The method of claim 10, wherein the determining the user authentication rule corresponds to the state of the computing device comprises:
reading an action linked to the user authentication rule; and
determining the action matches a corresponding state of the computing device.

19. A computer-readable device storing instructions executable by a processor, comprising:
instructions to determine a state of a computing device as one of a locked state or an unlocked state;
instructions to determine a user authentication rule corresponding to the state of the computing device, wherein the user authentication rule is one of a first user authentication rule associated with the locked state or a second user authentication rule associated with the unlocked state;
instructions to identify whether a combination of signals associated with the user authentication rule of the computing device are received by the computing device;
instructions to change or maintain the state of the computing device in the locked state in response to the combination of signals being a first combination of signals associated with the first user authentication rule; and
instructions to change or maintain the state of the computing device in the unlocked state in response to the combination of signals being a second combination of signals associated with the second user authentication rule.

20. The computer-readable device of claim 19, wherein the user authentication rule includes one or more user selected instructions indicating the combination of signals for user authentication.

* * * * *